(12) United States Patent
Pandy et al.

(10) Patent No.: US 11,738,743 B2
(45) Date of Patent: Aug. 29, 2023

(54) COLLISION AVOIDANCE METHOD AND SYSTEM FOR A VEHICLE

(71) Applicant: ZF Friedrichshafen AG, Friedrichshafen (DE)

(72) Inventors: Ananda Pandy, West Lafayette, IN (US); Christopher L. Tharp, Westfield, IN (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 211 days.

(21) Appl. No.: 17/192,258

(22) Filed: Mar. 4, 2021

(65) Prior Publication Data

US 2022/0281442 A1 Sep. 8, 2022

(51) Int. Cl.

| | |
|---|---|
| *B60W 30/09* | (2012.01) |
| *B60Q 9/00* | (2006.01) |
| *B60W 10/04* | (2006.01) |
| *B60W 10/20* | (2006.01) |
| *B60Q 1/46* | (2006.01) |
| *B60Q 5/00* | (2006.01) |

(52) U.S. Cl.
CPC .............. *B60W 30/09* (2013.01); *B60Q 1/46* (2013.01); *B60Q 5/006* (2013.01); *B60Q 9/008* (2013.01); *B60W 10/04* (2013.01); *B60W 10/20* (2013.01); *B60W 2552/53* (2020.02); *B60W 2554/801* (2020.02); *B60W 2720/10* (2013.01); *B60W 2720/12* (2013.01)

(58) Field of Classification Search
CPC ...... B60W 30/09; B60W 10/04; B60W 10/20; B60W 2552/53; B60W 2554/801; B60W 2720/10; B60W 2720/12; B60Q 1/46; B60Q 5/006; B60Q 9/008; B60Q 1/525
USPC ........................................................... 701/25
See application file for complete search history.

(56) References Cited

U.S. PATENT DOCUMENTS

| | | | |
|---|---|---|---|
| 2009/0037055 A1* | 2/2009 | Danner ..................... | B60T 7/22 701/45 |
| 2012/0262284 A1* | 10/2012 | Irrgang ................. | B60W 50/14 340/435 |
| 2018/0096601 A1* | 4/2018 | Chow ................... | H04W 84/00 |
| 2019/0256088 A1* | 8/2019 | Sharma ............. | B60W 30/0953 |
| 2019/0286148 A1* | 9/2019 | Hase ..................... | B60W 30/10 |
| 2019/0315345 A1* | 10/2019 | Newman ............... | B60W 50/14 |
| 2020/0031337 A1* | 1/2020 | Soltanian ............... | G06V 20/58 |
| 2020/0139962 A1* | 5/2020 | Kim .................. | B60W 30/0956 |

(Continued)

*Primary Examiner* — Jonathan M Dager
*Assistant Examiner* — Jean W Charleston
(74) *Attorney, Agent, or Firm* — Dority & Manning, P.A.

(57) ABSTRACT

A collision avoidance method for a vehicle includes monitoring a lateral distance between the vehicle and a target vehicle while the vehicle is travelling within a first lane and the target vehicle is travelling within an adjacent second lane, activating a warning on the vehicle and automatically adjusting operation of the vehicle to increase the distance between the vehicle and the target vehicle when the lateral distance between the vehicle and the target vehicle is less than the threshold distance while the vehicle is travelling within the first lane. Automatically adjusting operation of the vehicle may include one or both of steering the vehicle laterally away from the target vehicle and adjusting a longitudinal velocity of the vehicle. A related collision avoidance system is also provided.

10 Claims, 5 Drawing Sheets

(56) References Cited

U.S. PATENT DOCUMENTS

2021/0373575 A1* 12/2021 Manjunath ............. G08G 1/163
2022/0343762 A1* 10/2022 Alvarez ................ B60W 50/14

* cited by examiner

| | TARGET VEHICLE LATERAL VELOCITY | LANE BOUNDARY | OBJECT DETECTED | LATERAL VELOCITY OF OBJECT | TARGET VEHICLE POSITION | VEHICLE RESPONSE |
|---|---|---|---|---|---|---|
| 1 | HIGH | DASHED | YES | LOW | REAR | LATERALLY STEER TOWARDS OPPOSITE BOUNDARY AT A FIRST VELOCITY BUT NO CLOSER THAN FIRST DISTANCE, AND LONGITUDINALLY ACCELERATE FORWARD. |
| 2 | HIGH | SOLID | YES | LOW | REAR | LATERALLY STEER TOWARDS OPPOSITE BOUNDARY AT THE FIRST VELOCITY BUT NO CLOSER THAN A SECOND DISTANCE, AND LONGITUDINALLY ACCELERATE FORWARD. |
| 3 | HIGH | CURB | YES | LOW | REAR | LATERALLY STEER TOWARDS OPPOSITE BOUNDARY AT THE FIRST VELOCITY BUT NO CLOSER THAN A THIRD DISTANCE, AND LONGITUDINALLY ACCELERATE FORWARD. |
| 4 | HIGH | DASHED | NO | --- | REAR | LATERALLY STEER INTO OPPOSITE LANE AT THE FIRST VELOCITY. |
| 5 | HIGH | SOLID | NO | --- | REAR | AT THE FIRST VELOCITY, LATERALLY STEER TO BUT DO NOT CROSS OPPOSITE BOUNDARY, AND LONGITUDINALLY ACCELERATE FORWARD. |
| 6 | HIGH | CURB | NO | --- | REAR | LATERALLY STEER TOWARDS OPPOSITE BOUNDARY AT THE FIRST VELOCITY BUT NO CLOSER THAN A FOURTH DISTANCE, AND LONGITUDINALLY ACCELERATE FORWARD. |
| 7 | LOW | DASHED | NO | --- | REAR | LATERALLY STEER INTO OPPOSITE LANE AT A SECOND VELOCITY. |
| 8 | LOW | SOLID | NO | --- | REAR | AT THE SECOND VELOCITY, LATERALLY STEER TO BUT DO NOT CROSS OPPOSITE BOUNDARY, AND LONGITUDINALLY ACCELERATE FORWARD. |
| 9 | LOW | CURB | NO | --- | REAR | LATERALLY STEER TOWARDS OPPOSITE BOUNDARY AT THE SECOND VELOCITY BUT NO CLOSER THAN A FIFTH DISTANCE, AND LONGITUDINALLY ACCELERATE FORWARD. |
| 10 | HIGH | DASHED | YES | LOW | FRONT | LATERALLY STEER TOWARDS OPPOSITE BOUNDARY AT THE SECOND VELOCITY BUT NO CLOSER THAN THE FIRST DISTANCE, AND LONGITUDINALLY BRAKE. |

FIG. 6

COLLISION AVOIDANCE METHOD AND SYSTEM FOR A VEHICLE

FIELD OF THE INVENTION

The present subject matter relates generally to collision avoidance methods and systems for vehicles.

BACKGROUND OF THE INVENTION

Conventional vehicles generally rely upon a human driver to operate the vehicle. More particularly, conventional vehicles rely upon the human driver to avoid collisions with other vehicles.

The field of automated vehicles continues to see substantial investment and development. Automated vehicles generally replace and/or supplement the human driver. Thus, in contrast to conventional vehicles, human drivers may be unavailable to operate automated vehicles to avoid collisions with other vehicles. Moreover, advanced driver assist systems in semi-automated vehicles may assist human drivers with avoiding collisions.

Methods and systems for avoiding collisions in vehicles, such as automated vehicles, would be useful.

BRIEF DESCRIPTION OF THE INVENTION

Aspects and advantages of the invention will be set forth in part in the following description, or may be apparent from the description, or may be learned through practice of the invention.

The present subject matter relates generally to collision avoidance methods and systems for vehicles, such as autonomous vehicles. Example embodiments of the collision avoidance methods and systems may assist with monitoring nearby vehicles, including a target vehicle travelling in an adjacent lane and/or next to an ego vehicle. Risky behavior by the target vehicle may be identified, and operation of the ego vehicle may be adjusted in response to the risky behavior of the target vehicle. As an example, the target vehicle may be operated by a distracted driver such that the target vehicle unintentionally changes lanes, unacceptably increasing the potential for the target vehicle to collide within the ego vehicle. Example embodiments of the collision avoidance methods and systems may modify motion of the ego vehicle motion to reduce the potential for collision with the target vehicle. For instance, a distance between the ego vehicle and the target vehicle may be increased by laterally steering the ego vehicle away from the target vehicle and/or longitudinally accelerating the ego vehicle. The collision avoidance methods and systems described herein may be used in or with autonomous driving (AD) applications and/or advanced driver assist systems (ADAS).

In an example embodiment, a collision avoidance method for a vehicle includes monitoring a lateral distance between the vehicle and a target vehicle while the vehicle is travelling within a first lane and the target vehicle is travelling within an adjacent second lane, activating a warning on the vehicle in response to the lateral distance between the vehicle and the target vehicle being less than a threshold distance while the vehicle is travelling within the first lane, the warning including one or both of an audible warning and a visual warning, and automatically adjusting operation of the vehicle to increase the distance between the vehicle and the target vehicle when the lateral distance between the vehicle and the target vehicle is less than the threshold distance while the vehicle is travelling within the first lane. Automatically adjusting operation of the vehicle may include one or both of steering the vehicle laterally away from the target vehicle and adjusting a longitudinal velocity of the vehicle.

In a first example aspect, activating the warning includes operating one or both of a horn and hazard lights of the vehicle.

In a second example aspect, monitoring the lateral distance between the vehicle and the target vehicle includes determining a lateral relative velocity between the vehicle and the target vehicle.

In a third example aspect, the first lane extends laterally between a first boundary and a second boundary. The first boundary may be positioned laterally between the vehicle and the target vehicle, and the method further comprising detecting the second boundary of the first lane positioned opposite the target vehicle about the vehicle.

In a fourth example aspect, the collision avoidance method further includes detecting whether the target vehicle is positioned proximate a rear portion of the vehicle or a front portion of the vehicle.

In a fifth example aspect, the collision avoidance method further includes monitoring a side of the vehicle positioned opposite the target vehicle for an object.

In a sixth example aspect, when the object is detected opposite the target vehicle, the collision avoidance method further includes determining a lateral relative velocity between the vehicle and the object, and automatically adjusting operation of the vehicle includes one or more of: (1) laterally steering the vehicle towards the second boundary of the first lane at a first lateral velocity and longitudinally accelerating the vehicle forward when the determined lateral relative velocity between the vehicle and the target vehicle is greater than a threshold velocity, the second boundary of the first lane is a dashed lane marker, the determined lateral relative velocity between the vehicle and the object is less than an additional threshold velocity, and the target vehicle is detected proximate the rear portion of the vehicle in order to position the vehicle no less than a first lateral distance from the second boundary of the first lane after automatically adjusting operation of the vehicle; (2) laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a solid lane marker, the determined lateral relative velocity between the vehicle and the object is less than the additional threshold velocity, and the target vehicle is detected proximate the rear portion of the vehicle in order to position the vehicle no less than a second lateral distance from the second boundary of the first lane after automatically adjusting operation of the vehicle; and (3) laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a curb, the determined lateral relative velocity between the vehicle and the object is less than the additional threshold velocity, and the target vehicle is detected proximate the rear portion of the vehicle in order to position the vehicle no less than a third lateral distance from the second boundary of the first lane after automatically adjusting operation of the vehicle. The first lateral distance, the second lateral distance, and the third lateral distance are each a different respective lateral distance.

In a seventh example aspect, when no object is detected opposite the target vehicle, automatically adjusting operation of the vehicle includes one or more of: (1) laterally steering the vehicle over the second boundary of the first lane into an adjacent third lane at a first lateral velocity when the determined lateral relative velocity between the vehicle and the target vehicle is greater than a threshold velocity, the second boundary of the first lane is a dashed lane marker, and the target vehicle is detected proximate the rear portion of the vehicle; (2) laterally steering the vehicle towards but not across the second boundary of the first lane at the first lateral velocity and longitudinally accelerating the vehicle forward when the determined lateral relative velocity between the vehicle and the target vehicle is greater than the threshold velocity, the second boundary of the first lane is a solid lane marker, and the target vehicle is detected proximate the rear portion of the vehicle; and (3) laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a curb, and the target vehicle is detected proximate the rear portion of the vehicle in order to position the vehicle no less than a fourth lateral distance from the second boundary of the first lane.

In an eighth example aspect, when no object is detected opposite the target vehicle, automatically adjusting operation of the vehicle includes one or more of: (1) laterally steering the vehicle over the second boundary of the first lane into the adjacent third lane at a second lateral velocity when the determined lateral relative velocity between the vehicle and the target vehicle is less than the threshold velocity, the second boundary of the first lane is the dashed lane marker, and the target vehicle is detected proximate the rear portion of the vehicle; (2) laterally steering the vehicle towards but not across the second boundary of the first lane at the second lateral velocity and longitudinally accelerating the vehicle forward when the determined lateral relative velocity between the vehicle and the target vehicle is less than the threshold velocity, the second boundary of the first lane is the solid lane marker, and the target vehicle is detected proximate the rear portion of the vehicle; and (3) laterally steering the vehicle towards the second boundary of the first lane at the second lateral velocity and longitudinally accelerating the vehicle forward when the determined lateral relative velocity between the vehicle and the target vehicle is greater than the threshold velocity, the second boundary of the first lane is a curb, and the target vehicle is detected proximate the rear portion of the vehicle in order to position the vehicle no less than a fifth lateral distance from the second boundary of the first lane. The second lateral velocity is less than the first lateral velocity.

In a ninth example aspect, automatically adjusting operation of the vehicle includes laterally steering the vehicle towards the second boundary of the first lane at a first lateral velocity and longitudinally decelerating the vehicle when the determined lateral relative velocity between the vehicle and the target vehicle is greater than a threshold velocity, the second boundary of the first lane is a dashed lane marker, and the target vehicle is detected proximate the front portion of the vehicle in order to position the vehicle no less than a first lateral distance from the second boundary of the first lane after automatically adjusting operation of the vehicle.

In a tenth example aspect, a control system of an autonomous vehicle may be configured and/or programmed to implement the collision avoidance method. For instance, a collision avoidance system for a vehicle may include one or more processing devices and one or more non-transitory, computer-readable memories storing instructions that when executed by the one or more processing devices cause the one or more processing devices to: (1) monitor a lateral distance between the vehicle and a target vehicle while the vehicle is travelling within a first lane and the target vehicle is travelling within an adjacent second lane; (2) activate a warning on the vehicle in response to the lateral distance between the vehicle and the target vehicle being less than a threshold distance while the vehicle is travelling within the first lane, the warning including one or both of an audible warning and a visual warning; and (3) when the lateral distance between the vehicle and the target vehicle is less than the threshold distance while the vehicle is travelling within the first lane, automatically adjust operation of the vehicle to increase a distance between the vehicle and the target vehicle by one or both of steering the vehicle laterally away from the target vehicle and adjusting a longitudinal velocity of the vehicle.

Each of the example aspects recited above may be combined with one or more of the other example aspects recited above in certain embodiments. For instance, all of the ten example aspects recited above may be combined with one another in some embodiments. As another example, any combination of two, three, four, five, or more of the ten example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 6 is a response matrix for the example collision avoidance method of FIG. 5.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Example embodiments of the present disclosure are directed to collision avoidance methods and systems for vehicles. For example, collision avoidance methods and systems for vehicles may assist with detecting a target vehicle unintentionally approaching and/or crossing a boundary of a lane in which an ego vehicle is travelling, e.g., while the ego vehicle is not making a lane change. Operation of the ego vehicle may be adjusted in response to detecting the target vehicle unintentionally approaching and/or crossing the boundary. For example, a distance between the ego vehicle and the target vehicle may be increased by laterally steering the ego vehicle away from the target vehicle and/or longitudinally accelerating the ego vehicle. The collision avoidance methods and systems may be used in or with ADAS or AD systems.

Figure 1:
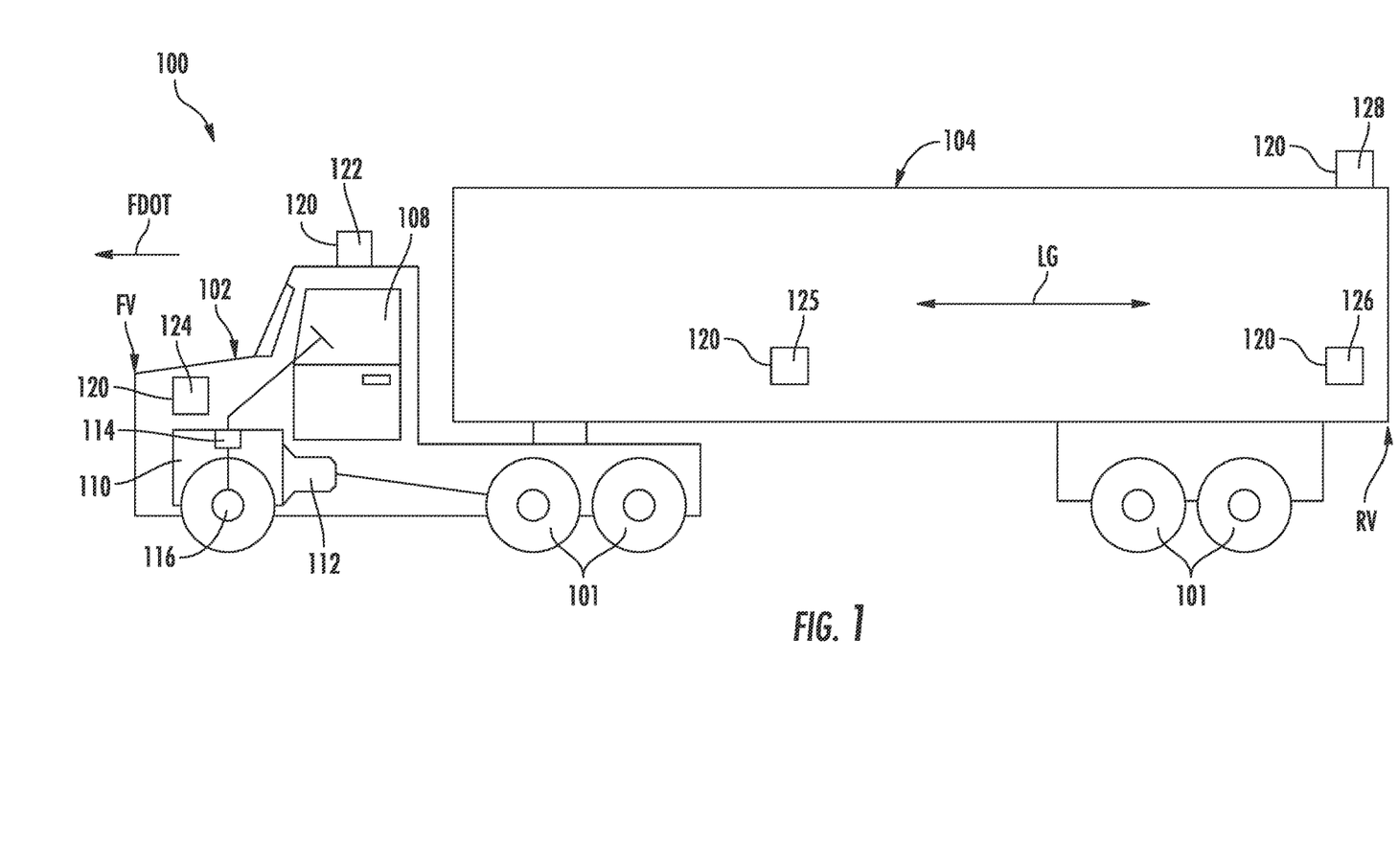
FIG. 1 is a side, elevation view of a commercial vehicle with a sensor system according to an example embodiment of the present subject matter.
Figure 2:
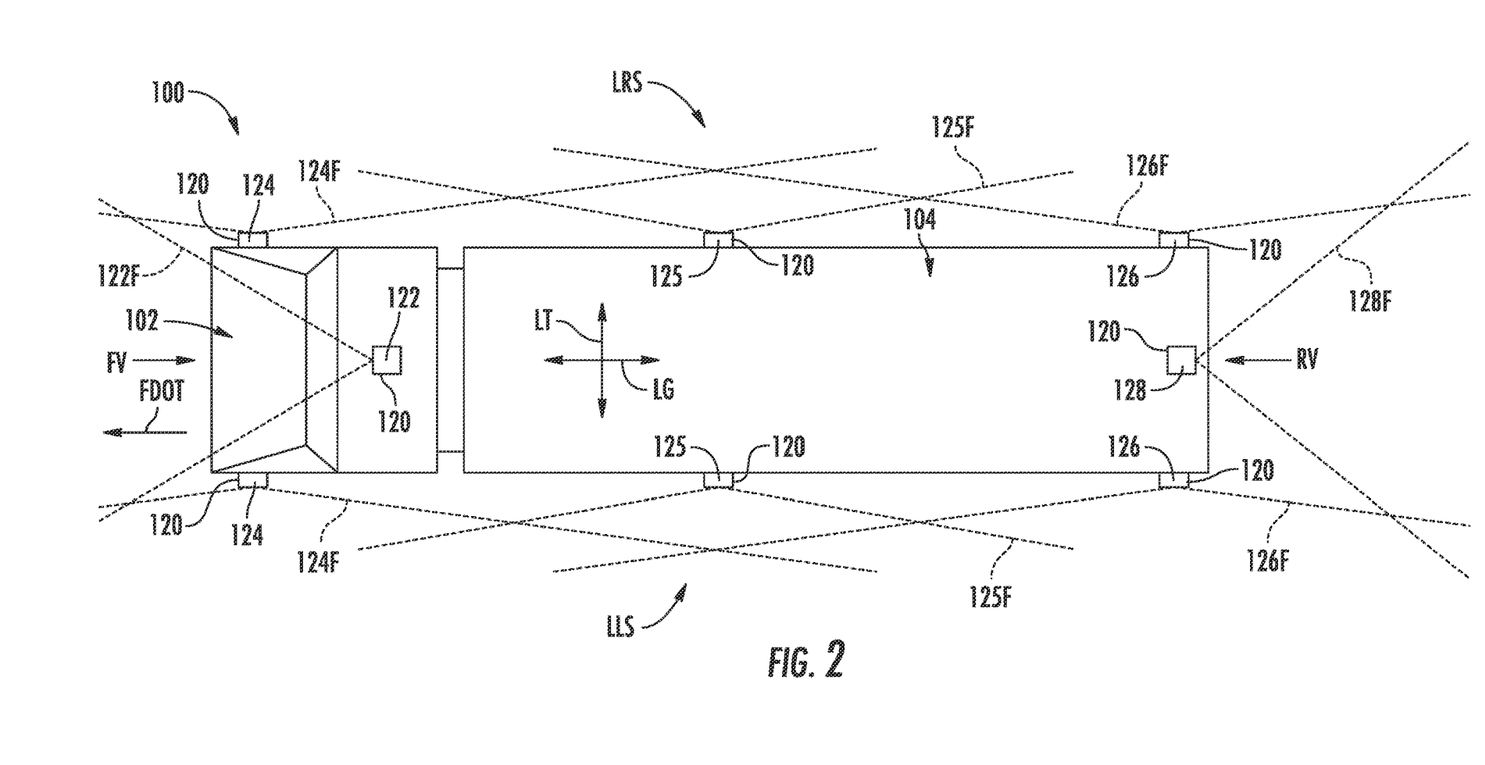
FIG. 2 is a top, plan view of the example commercial vehicle and the example sensor system of FIG. 1.

FIGS. 1 and 2 illustrate different views of a commercial vehicle 100 according to an example embodiment. For instance, FIG. 1 is a side, elevation view of commercial vehicle 100, and FIG. 2 is a top, plan view of commercial vehicle 100. As shown in FIGS. 1 and 2, commercial vehicle 100 includes a tractor 102 and a trailer 104 and is generally referred to as a "tractor-trailer truck." Commercial vehicle 100 is provided as an example only. For instance, commercial vehicle 100 may include one, two, or more additional trailers in alternative example embodiments. In addition, while described below in the context of commercial vehicle 100, it will be understood that the present subject matter may be used in or with any other suitable vehicle, including passenger vehicles, such as cars, vans, trucks, etc., or commercial vehicles, such as busses, box trucks, farm vehicles, construction vehicles, etc., in other example embodiments.

Commercial vehicle 100 may define a longitudinal direction LG and a lateral direction LT, which are perpendicular to each other. A front portion FV of commercial vehicle 100 and a rear portion RV of commercial vehicle 100 may be spaced apart from each other along the longitudinal direction LG. Thus, commercial vehicle 100 may extend between the front and rear portions FV, RV of commercial vehicle 100 along the longitudinal direction LG. Conversely, side portions of commercial vehicle 100 may be spaced apart from each other along the lateral direction LT. In particular, a left lateral side portion LLS of commercial vehicle 100 may be positioned opposite a right lateral side portion LRS of commercial vehicle 100 about the lateral direction LT. Thus, commercial vehicle 100 may extend between the left and right lateral side portions LLS, LRS of commercial vehicle 100 along the lateral direction LT.

Tractor 102 is pivotally connected to trailer 104 via a hitch 106 and is operative to tow trailer 104. Various items for transport may be stored within trailer 104. In alternative example embodiments, trailer 104 may be open, e.g., a flat bed, depending on items stored on trailer 104. Tractor 102 may include various components for towing trailer 104, including a motor system 110, a transmission system 112, a steering system 114, a braking system 116, etc. A rider may sit within a cab 108 of tractor 104 during operation. However, commercial vehicle 100 need not include seating within cab 108 or any cab 108 at all in certain example embodiments, e.g., when commercial vehicle 100 is configured for fully automated driving.

In general, motor system 110, transmission system 112, steering system 114, and braking system 116 may be configured in any conventional manner. For example, motor system 110 may generally include a suitable prime mover, such as an electric motor or internal combustion engine, that is operative to propel commercial vehicle 100. Motor system 110 may be disposed within tractor 102 and may be connected to transmission system 112. Transmission system 112 is disposed within power flow between motor system 110 and wheels 101 of commercial vehicle 100. Transmission system 112 is operative to provide various speed and torque ratios between an input and output of the transmission system 112. Thus, e.g., transmission system 112 may provide a mechanical advantage to assist propulsion of commercial vehicle 100 by motor system 110. Steering system 114 is operable to adjust the direction of travel of commercial vehicle 100. For instance, steering system 114 may be coupled to the front wheels 101 of commercial vehicle 100 and be operatable to turn the front wheels 101 in response to a driver of commercial vehicle turning a steering wheel within cab 108 and/or operation of a prime mover within steering system 114. Braking system 116 is operable to decelerate commercial vehicle 100. For instance, braking system 116 may include friction brakes configured to selectively reduce the rotational velocity of wheels 101. Braking system 116 may also be configured to as a regenerative braking system that converts kinetic energy of wheels 101 into electric current. Operation of motor system 110, transmission system 112, steering system 114, and braking system 116 is well known to those skilled in the art and not described in extensive detail herein for the sake of brevity.

Commercial vehicle 100 also includes various components for fully autonomous and/or semi-autonomous operation. For instance, a plurality of sensors 120 may be positioned on tractor 102 and/or trailer 104. For example, the plurality of sensors 120 may include one or more front sensors 122, one or more front-side sensors 124, one or more mid-side sensors 125, one or more rear-side sensors 126, and/or one or more rear sensors 128. Front sensor(s) 122 may be positioned and oriented with a field of view directed forward of commercial vehicle 100 in order to detect an object(s) in front of commercial vehicle 100 relative to forward direction of travel FDOT, such as another vehicle travelling in front of commercial vehicle 100. For instance, as illustrated, front sensor 122 may be positioned on top of tractor 102 (e.g., on top of cab 108) or on top of trailer 104 (not shown), with a field of view 122F (FIG. 2) of the front sensor 122 directed forward of the commercial vehicle 100 relative to forward direction of travel FDOT. Similarly, side sensor(s) 124, 125, 126 may be positioned and oriented with a collective or overlapping field of view extending outwardly from the sides of commercial vehicle 100 in order to detect an object(s) at any position along the sides of commercial vehicle 100, such as another vehicle travelling at the side of commercial vehicle 100. For example, side sensor(s) 124, 125, 126 may be positioned at each side (e.g., left and right lateral side portions LLS, LRS in FIG. 2) of commercial vehicle 100 such that a respective field of view 124F, 125F, 126F (FIG. 2) of the side sensor(s) 124, 125, 126 is directed outwardly from the relative side. For instance, as illustrated, front-side sensors 124 may be positioned on tractor 102 at each side (e.g., left and right lateral side portions LLS, LRS) of commercial vehicle 100 proximate front portion FV of commercial vehicle 100 relative to forward direction of travel FDOT, mid-side sensors 125 may be positioned on trailer 104 at each side (e.g., left and right lateral side portions LLS, LRS) of commercial vehicle 100 proximate a middle portion of commercial vehicle 100 relative to forward direction of travel FDOT, and rear-side sensors 126 may be positioned on trailer 104 at each side (e.g., left and right lateral side portions LLS, LRS) of commercial vehicle 100 proximate rear portion RV of commercial vehicle 100 relative to forward direction of travel FDOT. Further, rear sensor(s) 128 may be positioned and oriented with a field of view 128F (FIG. 2) directed rearward of commercial vehicle 100 relative to forward direction of travel FDOT in order to detect an object(s) behind commercial vehicle 100, such as another vehicle travelling behind commercial vehicle 100. For example, as illustrated, rear sensor 128 may be positioned on top of trailer 104 (e.g., on a roof of trailer 104) proximate rear portion RV of commercial vehicle 100 relative to forward direction of travel FDOT, or on the rear portion of trailer 104 (not shown) relative to forward direction of travel FDOT, with field of view 128F (FIG. 2) of rear sensor 128 being directed rearward of the commercial vehicle 100 relative to forward direction of travel FDOT. It will be understood that the positions of sensors 120 is provided by way of example only and alternative positions may be used to provide similar coverage. The respective field of view for each sensor 120 is generally indicated with the dashed lines extending from the sensor 120 in FIG. 2.

It should be appreciated that the sensors 120 may be configured as any suitable sensor for detecting object(s) adjacent or around commercial vehicle 100. For instance, each sensor 120 may include one or more of a LiDAR sensor unit, a radar sensor unit, a camera unit (e.g., optical or infrared), an acoustic sensor unit (e.g., microphone or sonar-type sensor), an inertial sensor unit (e.g., accelerometer or gyroscope), etc.

Figure 3:
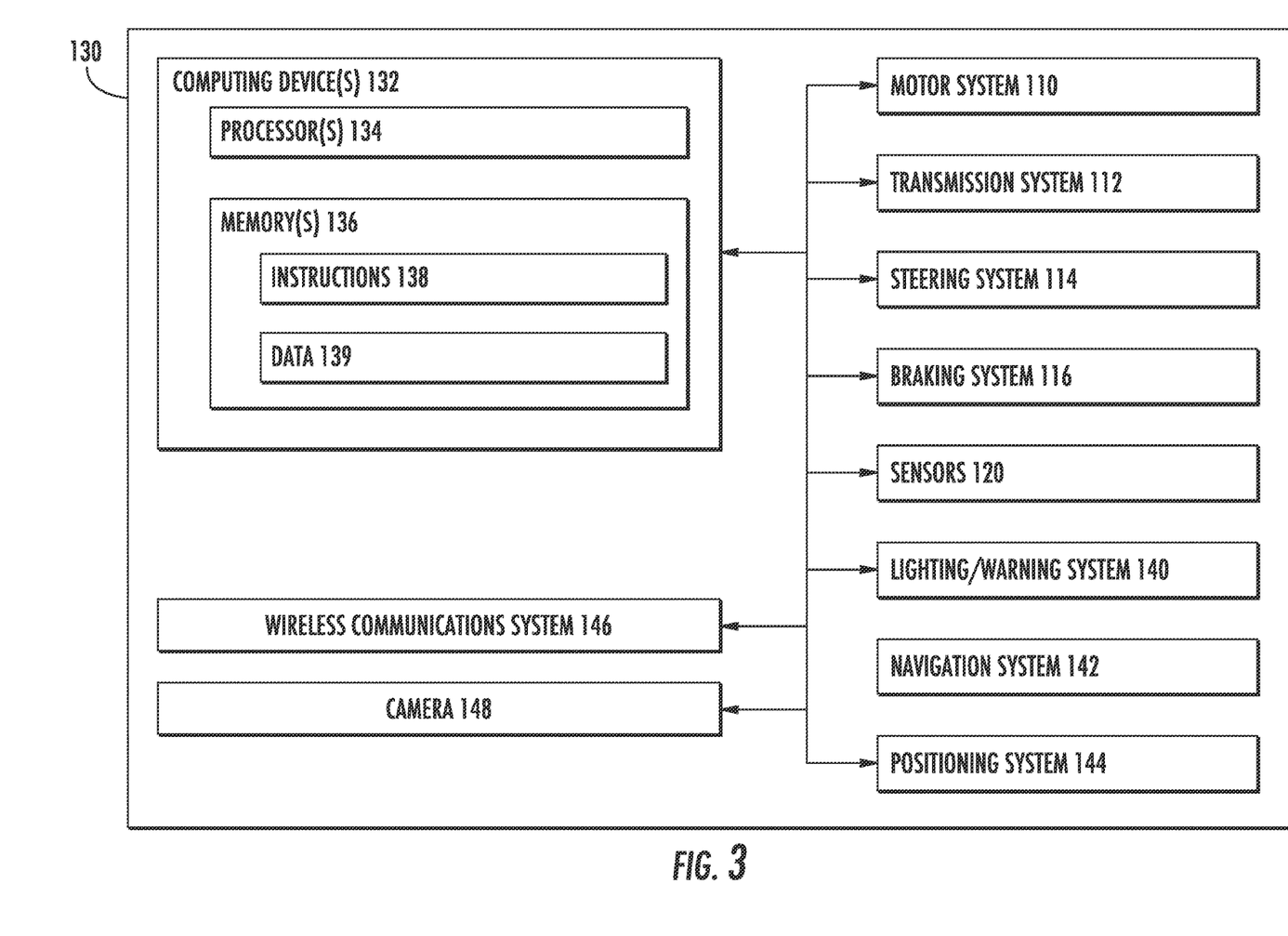
FIG. 3 is a schematic view of an example control system of the commercial vehicle of FIG. 1.

FIG. 3 is a schematic view of certain components of a control system 130 suitable for use with commercial vehicle 100. In general, control system 130 is configured to control operation of commercial vehicle 100 and components therein. Control system 130 may facilitate operation of commercial vehicle 100 in a fully autonomous and/or semi-autonomous mode of operation. For instance, control system 130 may be configured to operate commercial vehicle 100 in any of the levels defined by the U.S. National Highway Traffic Safety Administration and the Society of Automotive Engineers for defining the degree of control exercised by control system 130 to drive commercial vehicle 100. Level 0 has no automation, and the human driver makes all driving-related decisions; Level 1 is a semi-autonomous mode and includes some drive assistance, such as cruise control; Level 2 includes autonomous control of certain driving operations; Level 3 includes conditional automation that allows a human driver to selectively take control; Level 4 is a highly automated mode in which the commercial vehicle 100 is drivable without human assistance in certain conditions; and Level 5 is a fully autonomous mode in which the commercial vehicle 100 is drivable without human assistance in all situations. The present subject matter is operable to assist operation of commercial vehicle 100 in any of the semi-autonomous or fully autonomous modes described above, e.g., any of Levels 1-5, which is generally referred to herein as "autonomous" operation. Thus, as used herein, the term "autonomous" includes both semi-autonomous and fully autonomous operation, except when expressly indicated otherwise.

As shown in FIG. 3, control system 130 includes one or more computing devices 132 with one or more processors 134 and one or more memory devices 136 (hereinafter referred to as "memories 136"). In certain example embodiments, control system 130 may correspond to an electronic control unit (ECU) of tractor 102. The one or more memories 136 stores information accessible by the one or more processors 134, including instructions 138 that may be executed and data 139 usable by the one or more processors 134. The one or more memories 136 may be of any type capable of storing information accessible by the one or more processors 134, including a computing device-readable medium. The memory is a non-transitory medium, such as a hard-drive, memory card, optical disk, solid-state, tape memory, or the like. The one or more memories 136 may include different combinations of the foregoing, whereby different portions of the instructions and data are stored on different types of media. The one or more processor 134 may be any conventional processors, such as commercially available CPUs. Alternatively, the one or more processors 134 may be a dedicated device, such as an ASIC or other hardware-based processor.

Instructions 138 may be any set of instructions to be executed directly (such as machine code) or indirectly (such as scripts) by the one or more processors 134. For example, the instructions 138 may be stored as computing device code on the computing device-readable medium of the one or more memories 136. In that regard, the terms "instructions" and "programs" may be used interchangeably herein. Instructions 138 may be stored in object code format for direct processing by the processor or in any other computing device language, including scripts or collections of independent source code modules that are interpreted on demand or compiled in advance. Data 139 may be retrieved, stored, or modified by the one or more processors 134 in accordance with the instructions 138. For instance, data 139 of the one or more memories 136 may store information from sensors, including sensors 120. In FIG. 3, the processor(s) 134, memory(ies) 136, and other elements of computing device (s) 132 are shown within the same block. However, computing device(s) 132 may actually include multiple processors, computing devices, and/or memories that may or may not be stored within a common physical housing. Similarly, the one or more memories 136 may be a hard drive or other storage media located in a housing different from that of the processor(s) 134. Accordingly, computing device(s) 132 will be understood to include a collection of processor(s) and one or more memories that may or may not operate in parallel.

Control system 130, e.g., the computing device(s) 132, may form an autonomous driving system for commercial vehicle 100. The autonomous driving computing system may be configured for communicating with various components of commercial vehicle 100 in order to perform route planning and driving operations. For example, control system 130 may be in operative communication with various systems of the vehicle, including motor system 110, transmission system 112, steering system 114, and braking system 116. For instance, control system 130 may particularly be in operative communication with an engine control unit (ECU) 111 (not shown) of motor system 110 and a transmission control unit (TCU) 113 (not shown) of transmission system 112. Control unit 130 may also be in operative communication with other systems of commercial vehicle 100, including a lighting/warning system 140 (for controlling horns, headlights, taillights, and/or turn signals of commercial vehicle 100), a navigation system 142 (for navigating commercial vehicle 100 to a destination), and/or a positioning system 144 (for determining a current location (e.g., GPS coordinates) of commercial vehicle 100).

Control system 130, e.g., the computing device(s) 132, may be configured to control the direction and/or speed of commercial vehicle 100 by controlling the various components of commercial vehicle 100, such as motor system 110, transmission system 112, steering system 114, and braking system 116. For instance, control system 130 may navigate commercial vehicle 100 to a destination autonomously using data from navigation system 142 and/or positioning system 144. Computing device(s) 132 may use positioning system 144 to determine the current location of commercial vehicle 100 and sensors 120 to detect and navigate objects in order to reach the destination. During travel, computing device(s) 132 may selectively accelerate commercial vehicle (e.g., by throttling or energizing motor system 110), selectively decelerate commercial vehicle (e.g., by via motor system 110, changing gears within transmission system 112, and/or actuating braking system 116), and change the direction of travel for commercial vehicle 100 (e.g., by turning the front wheels 101 of commercial vehicle 100 with steering system 114).

Navigation system 142 may be used by control system 130 to determine and follow a route to a destination. Moreover, navigation system 142 and/or data 139 may store map information that computing device(s) 132 may utilize to navigate and/or control commercial vehicle 100. As an example, such maps within navigation system 142 and/or data 139 may include or be used to determine the shape and elevation of roadways, types of lane markers, intersection locations, crosswalks locations, speed limits, traffic light locations, building locations, sign types and locations, traffic information, etc. The lane markers may include features such as a single solid line, a single dashed line, double solid lines, double broken lines, a combination of a single solid line and single broken line, a curb, etc. Each lane is generally bounded by a left edge lane line and an opposite right edge lane line.

Sensors 120 may be used to detect external objects, such as other vehicles, obstacles in the roadway, lane markers, traffic signals, signs, trees, etc. Signals and data from sensors 120 may be received by control system 130 and/or stored within the one or more memories 136. For instance, sensors 120 may record data for processing by computing device(s) 132. Sensors 120 may detect objects and characteristics of the objects, such as location, orientation, size, shape, type, heading, velocity, acceleration, etc. The raw data from the sensors, such as LiDAR point clouds, and/or the aforementioned characteristics can be sent for further processing to the computing device(s) 132 periodically or continuously. Control system 130 may use signals from sensors 120 to detect and navigate around objects while commercial vehicle 100 is operating autonomously.

Control system 130 may also include a wireless communication system 146 assists with wireless communication with other systems. For instance, control system 130 may wirelessly connect control system 130 with one or more other vehicles, buildings, etc. directly or via a communication network. Wireless communication system 146 may include an antenna and a chipset configured to communicate according to one or more wireless communication protocols, such as Bluetooth, communication protocols described in IEEE 802.11, GSM, CDMA, UMTS, EV-DO, WiMAX, LTE, Zigbee, dedicated short range communications (DSRC), radio frequency identification (RFID) communications, etc. It should be appreciated that the internal communication between the computing device(s) 132 and the system(s) 110, 112, 114, 116, 120, 140, 142, 144, 146 within commercial vehicle 100 may be wired and/or wireless.

Figure 4:
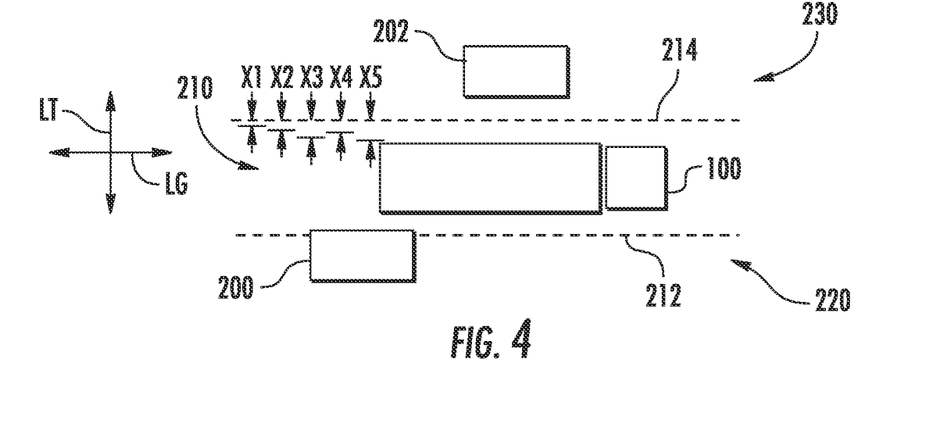
FIG. 4 is a top, plan view of the example commercial vehicle of FIG. 1 travelling in a lane next to other vehicles.

FIG. 4 is a top, plan view of commercial vehicle 100 travelling in a lane 210. Lane 210 includes two opposite boundaries, namely a first boundary 212 and a second boundary 214. Another vehicle 200 is travelling in an adjacent lane 220. First boundary 212 is positioned between lane 210 and adjacent lane 220. Second boundary 214 is positioned opposite first boundary 212 about lane 210. An object 202 is also positioned opposite other vehicle 200 about commercial vehicle 100. Thus, second boundary 214 may be positioned between commercial vehicle 100 and object 202. As an example, object 202 may be a third vehicle travelling in a third lane 230 adjacent commercial vehicle 100. As another example, object 202 may be a building, tree, wall, or any other object that occupies a space adjacent commercial vehicle opposite other vehicle 200.

In FIG. 4, commercial vehicle 100 is travelling in lane 210 between first and second boundaries 212, 214, and commercial vehicle 100 is not changing lanes. Conversely, other vehicle 200 is travelling substantially within adjacent lane 220 but is positioned at and partially over first boundary 212. As an example, the driver of other vehicle 200 may be distracted or may not see commercial vehicle 100. As other vehicle 200 approaches and/or crosses first boundary 212, a distance, e.g., along the lateral direction LT, between commercial vehicle 100 and other vehicle 200 may decrease, and the risk of collision between commercial vehicle 100 and other vehicle 200 may likewise increase. As discussed in greater detail below, the present subject matter may assist with adjusting operation of commercial vehicle 100 to reduce the risk of collision between commercial vehicle 100 and other vehicle 200. In certain instances, object 202 may limit movement of commercial vehicle 100, e.g., along the lateral direction L, away from other vehicle 200 when object 202 is present adjacent commercial vehicle 100.

Figure 5:
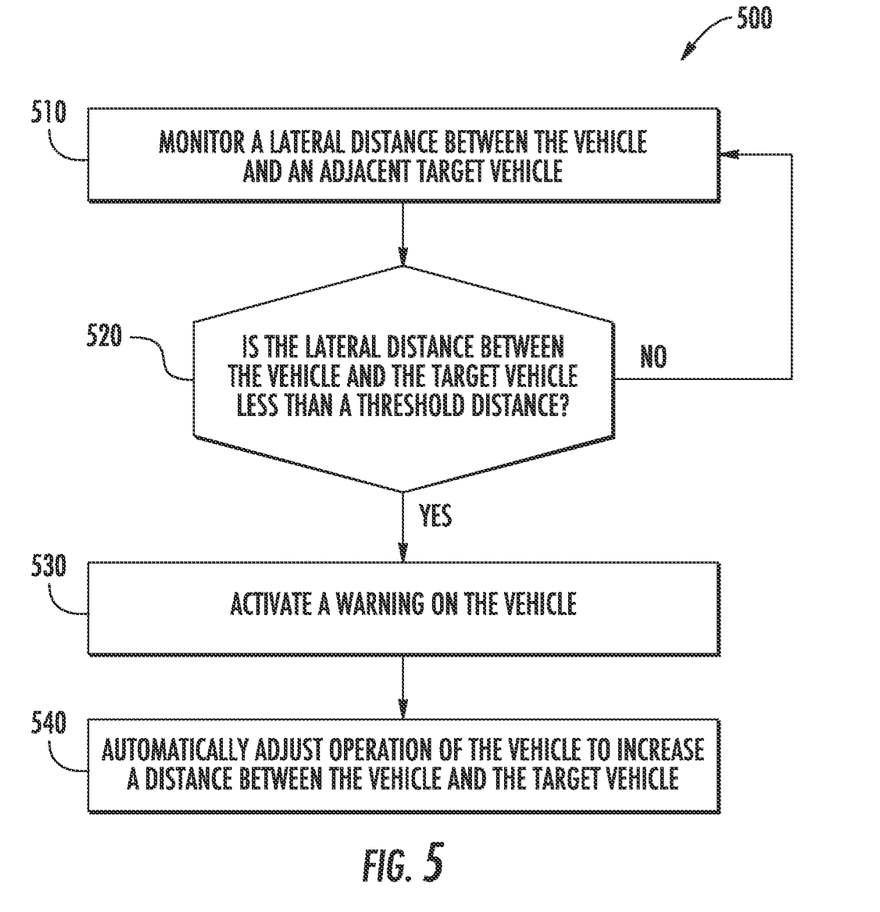
FIG. 5 is a diagram of a collision avoidance method for an automated vehicle according to an example embodiment of the present subject matter.

FIG. 5 is a diagram of a collision avoidance method 500 for a vehicle according to an example embodiment of the present subject matter. Method 500 may be used in or with any suitable vehicle. For example, method 500 may be used in or with passenger vehicles, such as cars, vans, trucks, etc., or commercial vehicles, such as busses, box trucks, farm vehicles, construction vehicles, etc. In certain example embodiments, method 500 may be used in or with commercial vehicle 100. In particular, control system 130 may be programmed to implement method 500. Thus, method 500 is described in greater detail below in the context of commercial vehicle 100. As discussed in greater detail below, method 500 may assist with detecting other vehicle 200 approaching and/or crossing first boundary 212 of first lane 210, e.g., while commercial vehicle 100 not making a lane change from first lane 210, and may also assist with adjusting operation of commercial vehicle to avoid a collision with other vehicle 200. In the context of the example embodiment described herein and with reference to FIG. 4, commercial vehicle 100 may be referred to as an "ego vehicle" and other vehicle 200 may be referred to as a "target vehicle."

Method 500 may be activated or started in response to activation conditions. For instance, control system 130 may begin method 500 when a speed of commercial vehicle 100 is greater than an activation speed. Thus, e.g., control system 130 may start method 500 when the speed of commercial vehicle 100 is no less than five kilometers per hour (5 kph), no less than eight kilometers per hour (8 kph), no less than fifteen kilometers per hour (15 kph), etc. The activation condition(s) may ensure that control system 130 deactivates or does not implement method 500 when commercial vehicle 100 is travelling at a relatively low velocity. Conversely, control system 130 may activate and implement method 500 when commercial vehicle 100 is travelling at a relatively high velocity. As another example, control system 130 may begin method 500 in response to a manual activation signal, e.g., received by control system 130 from a user.

At 510, method 500 may include monitoring a lateral distance between commercial vehicle 100 and other vehicle 200. Commercial vehicle 100 may be travelling within first lane 210 at 510, and other vehicle 200 may be travelling within second lane 220 at 510. For instance, commercial vehicle 100 may be travelling within first lane 210 while maintaining suitable spacing between first and second boundaries 212, 214 of first lane 210 while control system 130 monitors the lateral distance between commercial vehicle 100 and other vehicle 200 at 510. Control system 130 of commercial vehicle 100 may utilize sensors 120 to monitor the lateral distance between commercial vehicle 100 and other vehicle 200 at 510. For instance, at 510, control system 130 may receive one or more signals from sensors 120, including side sensor(s) 124, 125, 126 in order to measure the distance or gap between commercial vehicle 100 and other vehicle 200 along the lateral direction LT.

In some embodiment, at 510, method 500 may also include determining a lateral relative velocity between commercial vehicle 100 and other vehicle 200. For instance, control system 130 may calculate the lateral relative velocity between commercial vehicle 100 and other vehicle 200 at 510 using the signals from sensors 120, e.g., via the change in lateral distance between commercial vehicle 100 and other vehicle 200 over time. Thus, e.g., method 500 may also determine the rate of change for the gap size over time.

At 520, it may be determined whether the lateral distance between commercial vehicle 100 and other vehicle 200 from 510 is less than a threshold distance. For instance, at 520, control system 130 may compare the lateral distance between commercial vehicle 100 and other vehicle 200 determined from 510 to a predetermined threshold distance. The threshold distance may be selected to provide a suitable clearance between commercial vehicle 100 and other vehicle 200. As an example, the threshold distance may be one meter (1 m), eight-tenths of a meter (0.8 m), a half meter (0.5 m), etc. The threshold distance may be variable in certain example embodiments. For instance, the threshold distance may be directly proportional to the velocity of commercial vehicle 100 along the forward direction of travel FDOT. For example, the threshold distance may increase as the velocity of commercial vehicle 100 along the forward direction of travel FDOT increases, and the threshold distance may decrease as the velocity of commercial vehicle 100 along the forward direction of travel FDOT decreases. The threshold distance may thus adjust to account for the velocity of commercial vehicle 100 and provide a desired safety margin.

When the lateral distance between commercial vehicle 100 and other vehicle 200 from 510 is less not than the threshold distance at 520, method 500 may loop back to 510 and continue to monitor the lateral distance between commercial vehicle 100 and other vehicle 200. Thus, method 500 may operate as if the other vehicle 200 is maintaining proper lane position within second lane 220 when the lateral distance between commercial vehicle 100 and other vehicle 200 from 510 is not less than the threshold distance at 520. Conversely, method 500 may include remediating steps when the lateral distance between commercial vehicle 100 and other vehicle 200 from 510 is less than the threshold distance at 520. Thus, method 500 may operate as if the other vehicle 200 is not maintaining proper lane position within second lane 220, e.g., by approaching and/or crossing first boundary 212 of first lane 210, when the lateral distance between commercial vehicle 100 and other vehicle 200 determined from 510 is less than the threshold distance at 520.

For instance, at 530, a warning on commercial vehicle 100 may be activated in response to the lateral distance between commercial vehicle 100 and other vehicle 200 from 510 being less than the threshold distance at 520. The warning activated at 530 may be one or both of an audible warning and a visual warning. For instance, control system 130 may activate lighting/warning system 140 at 530. Thus, e.g., horns, headlights, taillights, side-lighting, etc. of commercial vehicle 100 may be activated at 530, e.g., in order to alert the driver of other vehicle 200 that other vehicle 200 is approaching commercial vehicle 100. Such alerting may cause the driver of other vehicle 200 to steer away from commercial vehicle 100 and thereby avoid a collision between commercial vehicle 100 and other vehicle 200.

Additionally, at 540, operation of commercial vehicle 100 may be automatically adjusted to increase a distance between commercial vehicle 100 and other vehicle 200 when the lateral distance between commercial vehicle 100 and other vehicle 200 is less than the threshold distance at 520. In particular, operation of commercial vehicle 100 may be automatically adjusted by one or both of steering commercial vehicle 100 away from other vehicle 200, e.g., along the lateral direction LT, and adjusting a velocity of commercial vehicle 100, e.g., along the longitudinal direction LG. For example, control system 130 may command steering system 114 to adjust the direction of travel of commercial vehicle 100 by turning the front wheels 101 of commercial vehicle 100 in order to steer commercial vehicle 100 away from other vehicle 200 along the lateral direction LT at 540. As another example, control system 130 may command motor system 110 to increase a power output of the prime mover in order to increase the velocity of commercial vehicle 100 along the longitudinal direction LG at 540. As yet another example, control system 130 may command braking system 116 to actuate and brake commercial vehicle 100, e.g., via friction brakes, in order to decrease the velocity of commercial vehicle 100 along the longitudinal direction LG at 540.

It will be understood that the order of 530 and 540 shown in FIG. 5 is provided by way of example only. Thus, e.g., 530 and 540 may be performed in parallel in alternative example embodiments. As another example, the order of 530 and 540 may be reversed in alternative example embodiments.

Method 500 may advantageously assist with reducing the risk of collisions between adjacent vehicles. For instance, method 500 may alert nearby drivers when a target vehicle unsafely approaches an ego vehicle (e.g., a vehicle configured to implement method 500) and/or adjust operation of the ego vehicle to increase the distance between the ego vehicle and the target vehicle. In certain example embodiments, method 500 may utilize additional information to assist with reducing the risk of collisions between the ego vehicle and the target vehicle, as discussed in greater detail below.

For instance, in some example embodiments, method 500 may further include one or more of detecting the second boundary 214 of first lane 210 (e.g., whether the second boundary 214 is a solid line, dashed line, curb, etc.), detecting whether the other vehicle 200 is positioned proximate rear portion RV or front portion FV of commercial vehicle 100, and monitoring for object(s) 202 to the side of commercial vehicle 100 opposite other vehicle 200 (e.g., while also determining a lateral relative velocity between commercial vehicle 100 and object 202). As an example, control system 130 may utilize sensor(s) 120 to detect whether the other vehicle 200 is positioned proximate rear portion RV or front portion FV of commercial vehicle 100 and monitor for object(s) 202 to the side of commercial vehicle 100 opposite other vehicle 200. As another example, control system 130 may receive one or more images of second boundary 214 from a camera 148 that is oriented to capture images and/or videos of second boundary 214. In alternative example embodiments, control system 130 may include a database of second boundaries in data 139, each of which is associated with a particular location. Based on the current location of commercial vehicle from positioning system 144, control system 130 may determine the second boundary 214 from the database of second boundaries in data 139.

Turning to FIG. 6, method 500 described with reference to FIG. 5 may implement various vehicle responses based upon the current inputs. In each row of the response matrix in FIG. 6, the respective vehicle response is listed in the right-hand column, and the statuses corresponding to each vehicle response are listed in the columns to the left. It will be understood that the responses and conditions shown FIG. 6 are provided by way of example only and are not intended to limit the present application to the specific responds and conditions shown. With reference to FIG. 6, automatic adjusting of commercial vehicle 100 at 540 of FIG. 5 is described in greater detail below.

As shown in the first row of FIG. 6, at 540, automatically adjusting operation of commercial vehicle 100 may include laterally steering commercial vehicle 100 towards second boundary 214 at a first lateral velocity V1, and longitudinally accelerating commercial vehicle 100 forward when: object 202 is detected opposite other vehicle 200; the lateral relative velocity between commercial vehicle 100 and other vehicle 200 is greater than a threshold velocity (e.g., and is thus a "High" velocity); the second boundary 214 is a dashed lane marker (e.g., such that third lane 230 is adjacent commercial vehicle 100 opposite second lane 220); the lateral relative velocity between commercial vehicle 100 and object 202 is less than an additional threshold velocity (e.g., such that commercial vehicle 100 and object 202 are not approaching each other); and other vehicle 200 is detected proximate rear portion RV of commercial vehicle 100. With the response in the first row, commercial vehicle 100 may not cross second boundary 214 during 540, and commercial vehicle 100 may be positioned no less than a first distance X1, e.g., along the lateral direction LT, from second boundary 214 after 540.

As shown in the second row of FIG. 6, at 540, automatically adjusting operation of commercial vehicle 100 may include laterally steering commercial vehicle 100 towards second boundary 214 at the first lateral velocity V1 and longitudinally accelerating commercial vehicle 100 forward when: object 202 is detected opposite other vehicle 200; the lateral relative velocity between commercial vehicle 100 and other vehicle 200 is greater than the threshold velocity; the second boundary 214 is a solid lane marker (e.g., such that there is no third lane adjacent commercial vehicle 100); the lateral relative velocity between commercial vehicle 100 and object 202 is less than the additional threshold velocity; and other vehicle 200 is detected proximate rear portion RV of commercial vehicle 100. With the response in the second row, commercial vehicle 100 may not cross second boundary 214 during 540, and commercial vehicle 100 may be positioned no less than a second distance X2, e.g., along the lateral direction LT, from second boundary 214 after 540.

As shown in the third row of FIG. 6, at 540, automatically adjusting operation of commercial vehicle 100 may include laterally steering commercial vehicle 100 towards second boundary 214 at the first lateral velocity V1 and longitudinally accelerating commercial vehicle 100 forward when: object 202 is detected opposite other vehicle 200; the lateral relative velocity between commercial vehicle 100 and other vehicle 200 is greater than the threshold velocity; the second boundary 214 is a curb (e.g., such that lateral movement of commercial vehicle 100 away from other vehicle 200 is limited by the curb); the lateral relative velocity between commercial vehicle 100 and object 202 is less than the additional threshold velocity; and other vehicle 200 is detected proximate rear portion RV of commercial vehicle 100. With the response in the third row, commercial vehicle 100 may not cross second boundary 214 during 540, and commercial vehicle 100 may be positioned no less than a third distance X3, e.g., along the lateral direction LT, from second boundary 214 after 540.

For the first, second, and third rows of the response matrix shown in FIG. 6, the first distance X1, the second distance X2, and the third distance X3 may each be a respective distance. For instance, the first distance X1 may be less than the second distance X2, and the second distance X2 may be less than the third distance X3. Thus, e.g., when second boundary 214 is a curb, method 500 may position commercial vehicle further from second boundary 214 relative to when second boundary 214 is a solid line, e.g., with an adjacent shoulder. Similarly, when second boundary 214 is the solid line, method 500 may position commercial vehicle further from second boundary 214 relative to when second boundary 214 is a dashed line, e.g., when third lane 230 is adjacent commercial vehicle 100. Thus, the response of commercial vehicle 100 at 540 may account for the type of second boundary 214 adjacent commercial vehicle 100.

As shown in the fourth row of FIG. 6, at 540, automatically adjusting operation of commercial vehicle 100 may include laterally steering commercial vehicle 100 into third lane 230 at the first lateral velocity V Land longitudinally accelerating commercial vehicle 100 forward when: no object is detected opposite other vehicle 200; the lateral relative velocity between commercial vehicle 100 and other vehicle 200 is greater than the threshold velocity; the second boundary 214 is a dashed line; and other vehicle 200 is detected proximate rear portion RV of commercial vehicle 100.

As shown in the fifth row of FIG. 6, at 540, automatically adjusting operation of commercial vehicle 100 may include laterally steering commercial vehicle 100 towards second boundary 214 at the first lateral velocity V1 and longitudinally accelerating commercial vehicle 100 forward when: no object is detected opposite other vehicle 200; the lateral relative velocity between commercial vehicle 100 and other vehicle 200 is greater than the threshold velocity; the second boundary 214 is a solid line; and other vehicle 200 is detected proximate rear portion RV of commercial vehicle 100. With the response in the fifth row, commercial vehicle 100 may not cross second boundary 214 during 540, and commercial vehicle 100 may be positioned at or immediate adjacent second boundary 214 after 540 (e.g., closer than first distance X1).

As shown in the sixth row of FIG. 6, at 540, automatically adjusting operation of commercial vehicle 100 may include laterally steering commercial vehicle 100 towards second boundary 214 at the first lateral velocity V1 and longitudinally accelerating commercial vehicle 100 forward when: no object is detected opposite other vehicle 200; the lateral relative velocity between commercial vehicle 100 and other vehicle 200 is greater than the threshold velocity; the second boundary 214 is a curb; and other vehicle 200 is detected proximate rear portion RV of commercial vehicle 100. With the response in the sixth row, commercial vehicle 100 may not cross second boundary 214 during 540, and commercial vehicle 100 may be positioned no less than a fourth distance X4, e.g., along the lateral direction LT, from second boundary 214 after 540. The fourth distance X4 may be less than the third distance X3. Thus, e.g., when there is no object adjacent commercial vehicle, method 500 may position commercial vehicle close to the curb.

As shown in the seventh row of FIG. 6, at 540, automatically adjusting operation of commercial vehicle 100 may include laterally steering commercial vehicle 100 into third lane 230 at a second lateral velocity V2 (e.g., and longitudinally accelerating commercial vehicle 100 forward) when: no object 202 is detected opposite other vehicle 200; the lateral relative velocity between commercial vehicle 100 and other vehicle 200 is less than the threshold velocity (e.g., and is thus a "Low" velocity); the second boundary 214 is a dashed line; and other vehicle 200 is detected proximate rear portion RV of commercial vehicle 100.

As shown in the eighth row of FIG. 6, at 540, automatically adjusting operation of commercial vehicle 100 may include laterally steering commercial vehicle 100 towards second boundary 214 at the second lateral velocity V2 and longitudinally accelerating commercial vehicle 100 forward when: no object is detected opposite other vehicle 200; the lateral relative velocity between commercial vehicle 100 and other vehicle 200 is less than the threshold velocity; the second boundary 214 is a solid line; and other vehicle 200 is detected proximate rear portion RV of commercial vehicle 100. With the response in the eighth row, commercial vehicle 100 may not cross second boundary 214 during 540, and commercial vehicle 100 may be positioned at or immediate adjacent second boundary 214 after 540.

As shown in the ninth row of FIG. 6, at 540, automatically adjusting operation of commercial vehicle 100 may include laterally steering commercial vehicle 100 towards second boundary 214 at the second lateral velocity V2 and longitudinally accelerating commercial vehicle 100 forward when: no object is detected opposite other vehicle 200; the lateral relative velocity between commercial vehicle 100 and other vehicle 200 is less than the threshold velocity; the second boundary 214 is the curb; and other vehicle 200 is detected proximate rear portion RV of commercial vehicle 100. With the response in the ninth row, commercial vehicle 100 may not cross second boundary 214 during 540, and commercial vehicle 100 may be positioned no less than a fifth distance X5, e.g., along the lateral direction LT, from second boundary 214 after 540. The fifth distance X5 may be greater than the third and fourth distances X3, X4. Thus, e.g., when the relative lateral velocity between commercial vehicle 100 and other vehicle 200 is low, method 500 may position commercial vehicle further from the curb.

The second velocity V2 may be different than the first velocity V1. For instance, the second velocity V2 may be less than the first velocity V1. Thus, e.g., when the relative lateral velocity between commercial vehicle 100 and other vehicle 200 is low, method 500 may increase the distance between commercial vehicle 100 and other vehicle 200 more slowly as compared to when the relative lateral velocity between commercial vehicle 100 and other vehicle 200 is high.

As shown in the tenth row of FIG. 6, at 540, automatically adjusting operation of commercial vehicle 100 may include laterally steering commercial vehicle 100 towards second boundary 214 at the first lateral velocity V1, and longitudinally braking commercial vehicle 100 when: object 202 is detected opposite other vehicle 200; the lateral relative velocity between commercial vehicle 100 and other vehicle 200 is greater than the threshold velocity; the second boundary 214 is a dashed lane marker; the lateral relative velocity between commercial vehicle 100 and object 202 is less than the additional threshold velocity; and other vehicle 200 is detected proximate front portion FV of commercial vehicle 100. Commercial vehicle 100 may not cross second boundary 214 during 540, and commercial vehicle 100 may be positioned no less than the first distance X1, e.g., along the lateral direction LT, from second boundary 214 after 540.

As may be seen from the above, the response in the tenth row corresponds to the first row except with regard to the direction of longitudinal acceleration. This difference is due to the position of the other vehicle 200 relative to the commercial vehicle 100. In particular, the other vehicle 200 is detected proximate front portion FV of commercial vehicle 100 in the tenth row, and the other vehicle 200 is detected proximate rear portion RV of commercial vehicle 100 in the first row. Accordingly, method 500 may adjust the direction of longitudinal acceleration in the same manner as the tenth row for each of the second through ninth rows when the only difference in current inputs is that the other vehicle 200 is detected proximate front portion FV of commercial vehicle 100 rather than proximate rear portion RV of commercial vehicle 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

100 Commercial vehicle
101 Wheels
102 Tractor
104 Trailer
110 Motor system

112 Transmission system
114 Steering system
116 Braking system
120 Sensors
122 Front sensor
122F Field of view
124 Front-side sensors
124F Field of view
125 Mid-side sensors
125F Field of view
126 Rear-side sensors
126F Field of view
128 Rear sensor
128F Field of view
130 Control system
132 Computing devices
134 Processors
136 Memories
138 Instructions
139 Data
140 Lighting/warning system
142 Navigation system
144 Positioning system
146 Wireless communications system
200 Other vehicle
202 Object
210 Lane
212 First boundary
214 Second boundary
220 Other lane
400 Method
500 Method
FDOT Forward direction of travel
LG Longitudinal direction
FV Front portion
RV Rear portion
LT Lateral direction
LLS Lateral left side
LRS Lateral right side

What is claimed is:

1. A collision avoidance method for a vehicle, comprising:
monitoring a lateral distance between the vehicle and a target vehicle and determining a lateral relative velocity between the vehicle and the target vehicle while the vehicle is travelling within a first lane and the target vehicle is travelling within an adjacent second lane, the first lane extending laterally between a first boundary and a second boundary, the first boundary being positioned laterally between the vehicle and the target vehicle;
detecting the second boundary of the first lane positioned opposite the target vehicle about the vehicle;
detecting whether the target vehicle is positioned proximate a rear portion of the vehicle or a front portion of the vehicle;
monitoring a side of the vehicle positioned opposite the target vehicle for an object;
activating a warning on the vehicle in response to the lateral distance between the vehicle and the target vehicle being less than a threshold distance while the vehicle is travelling within the first lane, the warning comprising one or both of an audible warning and a visual warning; and
automatically adjusting operation of the vehicle to increase a distance between the vehicle and the target vehicle when the lateral distance between the vehicle and the target vehicle is less than the threshold distance while the vehicle is travelling within the first lane,
wherein automatically adjusting operation of the vehicle comprises one or both of steering the vehicle laterally away from the target vehicle and adjusting a longitudinal velocity of the vehicle,
wherein automatically adjusting operation of the vehicle comprises laterally steering the vehicle towards the second boundary of the first lane at a first lateral velocity and longitudinally decelerating the vehicle when the determined lateral relative velocity between the vehicle and the target vehicle is greater than a threshold velocity, the second boundary of the first lane is a dashed lane marker, and the target vehicle is detected proximate the front portion of the vehicle in order to position the vehicle no less than a first lateral distance from the second boundary of the first lane after automatically adjusting operation of the vehicle.

2. The collision avoidance method of claim 1, wherein activating the warning comprises operating one or both of a horn and hazard lights of the vehicle.

3. A collision avoidance method for a vehicle, comprising:
monitoring a lateral distance between the vehicle and a target vehicle and determining a lateral relative velocity between the vehicle and the target vehicle while the vehicle is travelling within a first lane and the target vehicle is travelling within an adjacent second lane, the first lane extending laterally between a first boundary and a second boundary, the first boundary being positioned laterally between the vehicle and the target vehicle;
detecting the second boundary of the first lane positioned opposite the target vehicle about the vehicle;
detecting whether the target vehicle is positioned proximate a rear portion of the vehicle or a front portion of the vehicle;
monitoring a side of the vehicle positioned opposite the target vehicle for an object;
determining a lateral relative velocity between the vehicle and the object;
activating a warning on the vehicle in response to the lateral distance between the vehicle and the target vehicle being less than a threshold distance while the vehicle is travelling within the first lane, the warning comprising one or both of an audible warning and a visual warning; and
automatically adjusting operation of the vehicle to increase a distance between the vehicle and the target vehicle when the lateral distance between the vehicle and the target vehicle is less than the threshold distance while the vehicle is travelling within the first lane,
wherein automatically adjusting operation of the vehicle comprises one or both of steering the vehicle laterally away from the target vehicle and adjusting a longitudinal velocity of the vehicle,
wherein, when the object is detected opposite the target vehicle, automatically adjusting operation of the vehicle comprises one or more of:
laterally steering the vehicle towards the second boundary of the first lane at a first lateral velocity and longitudinally accelerating the vehicle forward when the determined lateral relative velocity between the vehicle and the target vehicle is greater than a threshold velocity, the second boundary of the first lane is a dashed lane marker, the determined lateral relative velocity between the vehicle and the object is less than an additional threshold velocity, and the target vehicle is detected proximate the rear portion of the vehicle in order to position the vehicle no less than a first lateral distance from the second boundary of the first lane after automatically adjusting operation of the vehicle;

laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a solid lane marker, the determined lateral relative velocity between the vehicle and the object is less than the additional threshold velocity, and the target vehicle is detected proximate the rear portion of the vehicle in order to position the vehicle no less than a second lateral distance from the second boundary of the first lane after automatically adjusting operation of the vehicle; and laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a curb, the determined lateral relative velocity between the vehicle and the object is less than the additional threshold velocity, and the target vehicle is detected proximate the rear portion of the vehicle in order to position the vehicle no less than a third lateral distance from the second boundary of the first lane after automatically adjusting operation of the vehicle, wherein the first lateral distance, the second lateral distance, and the third lateral distance are each a different respective lateral distance.

4. A collision avoidance method for a vehicle, comprising:
monitoring a lateral distance between the vehicle and a target vehicle and determining a lateral relative velocity between the vehicle and the target vehicle while the vehicle is travelling within a first lane and the target vehicle is travelling within an adjacent second lane, the first lane extending laterally between a first boundary and a second boundary, the first boundary being positioned laterally between the vehicle and the target vehicle;
detecting the second boundary of the first lane positioned opposite the target vehicle about the vehicle;
detecting whether the target vehicle is positioned proximate a rear portion of the vehicle or a front portion of the vehicle;
monitoring a side of the vehicle positioned opposite the target vehicle for an object;
activating a warning on the vehicle in response to the lateral distance between the vehicle and the target vehicle being less than a threshold distance while the vehicle is travelling within the first lane, the warning comprising one or both of an audible warning and a visual warning; and
automatically adjusting operation of the vehicle to increase a distance between the vehicle and the target vehicle when the lateral distance between the vehicle and the target vehicle is less than the threshold distance while the vehicle is travelling within the first lane,
wherein automatically adjusting operation of the vehicle comprises one or both of steering the vehicle laterally away from the target vehicle and adjusting a longitudinal velocity of the vehicle,
wherein, when no object is detected opposite the target vehicle, automatically adjusting operation of the vehicle comprises one or more of:
laterally steering the vehicle over the second boundary of the first lane into an adjacent third lane at a first lateral velocity when the determined lateral relative velocity between the vehicle and the target vehicle is greater than a threshold velocity, the second boundary of the first lane is a dashed lane marker, and the target vehicle is detected proximate the rear portion of the vehicle;
laterally steering the vehicle towards but not across the second boundary of the first lane at the first lateral velocity and longitudinally accelerating the vehicle forward when the determined lateral relative velocity between the vehicle and the target vehicle is greater than the threshold velocity, the second boundary of the first lane is a solid lane marker, and the target vehicle is detected proximate the rear portion of the vehicle; and
laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a curb, and the target vehicle is detected proximate the rear portion of the vehicle in order to position the vehicle no less than a fourth lateral distance from the second boundary of the first lane.

5. A collision avoidance method for a vehicle, comprising:
monitoring a lateral distance between the vehicle and a target vehicle and determining a lateral relative velocity between the vehicle and the target vehicle while the vehicle is travelling within a first lane and the target vehicle is travelling within an adjacent second lane, the first lane extending laterally between a first boundary and a second boundary, the first boundary being positioned laterally between the vehicle and the target vehicle;
detecting the second boundary of the first lane positioned opposite the target vehicle about the vehicle;
detecting whether the target vehicle is positioned proximate a rear portion of the vehicle or a front portion of the vehicle;
monitoring a side of the vehicle positioned opposite the target vehicle for an object;
activating a warning on the vehicle in response to the lateral distance between the vehicle and the target vehicle being less than a threshold distance while the vehicle is travelling within the first lane, the warning comprising one or both of an audible warning and a visual warning; and
automatically adjusting operation of the vehicle to increase a distance between the vehicle and the target vehicle when the lateral distance between the vehicle and the target vehicle is less than the threshold distance while the vehicle is travelling within the first lane,
wherein automatically adjusting operation of the vehicle comprises one or both of steering the vehicle laterally away from the target vehicle and adjusting a longitudinal velocity of the vehicle,
wherein, when no object is detected opposite the target vehicle, automatically adjusting operation of the vehicle comprises one or more of:

laterally steering the vehicle over the second boundary of the first lane into the adjacent third lane at a second lateral velocity when the determined lateral relative velocity between the vehicle and the target vehicle is less than the threshold velocity, the second boundary of the first lane is the dashed lane marker, and the target vehicle is detected proximate the rear portion of the vehicle;

laterally steering the vehicle towards but not across the second boundary of the first lane at the second lateral velocity and longitudinally accelerating the vehicle forward when the determined lateral relative velocity between the vehicle and the target vehicle is less than the threshold velocity, the second boundary of the first lane is the solid lane marker, and the target vehicle is detected proximate the rear portion of the vehicle; and laterally steering the vehicle towards the second boundary of the first lane at the second lateral velocity and longitudinally accelerating the vehicle forward when the determined lateral relative velocity between the vehicle and the target vehicle is greater than the threshold velocity, the second boundary of the first lane is a curb, and the target vehicle is detected proximate the rear portion of the vehicle in order to position the vehicle no less than a fifth lateral distance from the second boundary of the first lane, wherein the second lateral velocity is less than the first lateral velocity.

6. A collision avoidance system for a vehicle, comprising:
one or more processing devices; and
one or more non-transitory, computer-readable memories storing instructions that when executed by the one or more processing devices cause the one or more processing devices to
 monitor a lateral distance between the vehicle and a target vehicle while the vehicle is travelling within a first lane and the target vehicle is travelling within an adjacent second lane;
 determine a lateral relative velocity between the vehicle and the target vehicle;
 establish a second boundary of the first lane positioned opposite the target vehicle, the first lane extending laterally between a first boundary and the second boundary, the first boundary being positioned laterally between the vehicle and the target vehicle;
 establish whether the target vehicle is positioned proximate a rear portion of the vehicle or a front portion of the vehicle;
 monitor a side of the vehicle positioned opposite the target vehicle for an object;
 activate a warning on the vehicle in response to the lateral distance between the vehicle and the target vehicle being less than a threshold distance while the vehicle is travelling within the first lane, the warning comprising one or both of an audible warning and a visual warning; and
 when the lateral distance between the vehicle and the target vehicle is less than the threshold distance while the vehicle is travelling within the first lane, automatically adjust operation of the vehicle to increase a distance between the vehicle and the target vehicle by one or both of steering the vehicle laterally away from the target vehicle and adjusting a longitudinal velocity of the vehicle,
 wherein the operation of the vehicle automatically is adjusted by one or more of laterally steering the vehicle towards the second boundary of the first lane at a first lateral velocity and longitudinally decelerating the vehicle backward when the determined lateral relative velocity between the vehicle and the target vehicle is greater than a threshold velocity, the second boundary of the first lane is a dashed lane marker, and the target vehicle is detected proximate the front portion of the vehicle in order to position the vehicle no less than a first lateral distance from the second boundary of the first lane after automatically adjusting operation of the vehicle.

7. The collision avoidance system of claim 6, wherein the instructions, when executed by the one or more processing devices, further cause the one or more processing devices to activate the warning by operating one or both of a horn and hazard lights of the vehicle.

8. The collision avoidance system of claim 6, wherein, when no object is detected opposite the target vehicle, the instructions, when executed by the one or more processing devices, further cause the one or more processing devices to automatically adjust operation of the vehicle by one or more of:
 laterally steering the vehicle over the second boundary of the first lane into the adjacent third lane at a second lateral velocity when the determined lateral relative velocity between the vehicle and the target vehicle is less than the threshold velocity, the second boundary of the first lane is the dashed lane marker, and the target vehicle is detected proximate the rear portion of the vehicle;
 laterally steering the vehicle towards but not across the second boundary of the first lane at the second lateral velocity and longitudinally accelerating the vehicle forward when the determined lateral relative velocity between the vehicle and the target vehicle is less than the threshold velocity, the second boundary of the first lane is the solid lane marker, and the target vehicle is detected proximate the rear portion of the vehicle; and
 laterally steering the vehicle towards the second boundary of the first lane at the second lateral velocity and longitudinally accelerating the vehicle forward when the determined lateral relative velocity between the vehicle and the target vehicle is greater than the threshold velocity, the second boundary of the first lane is a curb, and the target vehicle is detected proximate the rear portion of the vehicle in order to position the vehicle no less than a fifth lateral distance from the second boundary of the first lane,
 wherein the second lateral velocity is less than the first lateral velocity.

9. The collision avoidance system of claim 6, wherein, when the object is detected opposite the target vehicle, the instructions, when executed by the one or more processing devices, further cause the one or more processing devices to
 determine a lateral relative velocity between the vehicle, and
 automatically adjust operation of the vehicle by one or more of:
  laterally steering the vehicle towards the second boundary of the first lane at a first lateral velocity and longitudinally accelerating the vehicle forward when the determined lateral relative velocity between the vehicle and the target vehicle is greater than a threshold velocity, the second boundary of the first lane is a dashed lane marker, the determined lateral relative velocity between the vehicle and the object is less than an additional threshold velocity, and the target vehicle is detected proximate the rear portion of the vehicle in order to position the vehicle no less than a first lateral distance from the second boundary of the first lane after automatically adjusting operation of the vehicle;

laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a solid lane marker, the determined lateral relative velocity between the vehicle and the object is less than the additional threshold velocity, and the target vehicle is detected proximate the rear portion of the vehicle in order to position the vehicle no less than a second lateral distance from the second boundary of the first lane after automatically adjusting operation of the vehicle; and laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a curb, the determined lateral relative velocity between the vehicle and the object is less than the additional threshold velocity, and the target vehicle is detected proximate the rear portion of the vehicle in order to position the vehicle no less than a third lateral distance from the second boundary of the first lane after automatically adjusting operation of the vehicle, wherein the first lateral distance, the second lateral distance, and the third lateral distance are each a different respective lateral distance.

10. The collision avoidance system of claim 6, wherein, when no object is detected opposite the target vehicle, the instructions, when executed by the one or more processing devices, further cause the one or more processing devices to automatically adjust operation of the vehicle by one or more of:

laterally steering the vehicle over the second boundary of the first lane into an adjacent third lane at a first lateral velocity when the determined lateral relative velocity between the vehicle and the target vehicle is greater than a threshold velocity, the second boundary of the first lane is a dashed lane marker, and the target vehicle is detected proximate the rear portion of the vehicle;

laterally steering the vehicle towards but not across the second boundary of the first lane at the first lateral velocity and longitudinally accelerating the vehicle forward when the determined lateral relative velocity between the vehicle and the target vehicle is greater than the threshold velocity, the second boundary of the first lane is a solid lane marker, and the target vehicle is detected proximate the rear portion of the vehicle; and laterally steering the vehicle towards the second boundary of the first lane at the first lateral velocity and longitudinally accelerating the vehicle forward when the determined lateral relative velocity between the vehicle and the target vehicle is greater than the threshold velocity, the second boundary of the first lane is a curb, and the target vehicle is detected proximate the rear portion of the vehicle in order to position the vehicle no less than a fourth lateral distance from the second boundary of the first lane.

\* \* \* \* \*